United States Patent
Cheon et al.

(10) Patent No.: US 10,360,938 B2
(45) Date of Patent: Jul. 23, 2019

(54) APPARATUS, METHODS, AND SYSTEMS FOR CONTROLLING TONEARM TRACKING FOR A RECORD TURNTABLE

(71) Applicant: Koolance, Inc., Auburn, WA (US)

(72) Inventors: Kioan Cheon, Auburn, WA (US); AnKuk Song, Anyang-si (KR)

( * ) Notice: Subject to any disclaimer, the term of this patent is extended or adjusted under 35 U.S.C. 154(b) by 0 days.

(21) Appl. No.: 15/553,959

(22) PCT Filed: Feb. 25, 2016

(86) PCT No.: PCT/US2016/019652
§ 371 (c)(1),
(2) Date: Aug. 25, 2017

(87) PCT Pub. No.: WO2016/138317
PCT Pub. Date: Sep. 1, 2016

(65) Prior Publication Data
US 2018/0247670 A1    Aug. 30, 2018

Related U.S. Application Data

(60) Provisional application No. 62/120,740, filed on Feb. 25, 2015.

(51) Int. Cl.
| | |
|---|---|
| *G11B 3/10* | (2006.01) |
| *G11B 13/06* | (2006.01) |
| *G11B 3/36* | (2006.01) |
| *G11B 3/02* | (2006.01) |
| *G11B 3/60* | (2006.01) |

(52) U.S. Cl.
CPC ............... *G11B 13/06* (2013.01); *G11B 3/02* (2013.01); *G11B 3/10* (2013.01); *G11B 3/36* (2013.01); *G11B 3/60* (2013.01)

(58) Field of Classification Search
None
See application file for complete search history.

(56) References Cited

U.S. PATENT DOCUMENTS

| | | | | |
|---|---|---|---|---|
| 2,837,339 A | * | 6/1958 | Puda .................. | G11B 3/38 33/32.1 |
| 2,862,716 A | * | 12/1958 | Marks ................ | G11B 3/08 369/250 |
| 2,977,126 A | * | 3/1961 | Chalfin .............. | G11B 3/08 369/224 |

(Continued)

FOREIGN PATENT DOCUMENTS

| | | | | |
|---|---|---|---|---|
| JP | 56003405 A | * | 1/1981 | |
| JP | 56003406 A | * | 1/1981 | |

(Continued)

*Primary Examiner* — William J Klimowicz
(74) *Attorney, Agent, or Firm* — DWC Law Firm, P.S.; David Chen

(57) ABSTRACT

Apparatus, methods, and systems for use in providing tangential (linear) tracking of a stylus on a record during play. In some embodiments, a tonearm assembly includes a tonearm with a laser emission source mounted thereto, and a receiver for receiving a light beam from the laser emission source and for splitting the light beam, and a movement actuator for adjusting a position of the tonearm based on a differential in light intensity between different portions of the split beam.

13 Claims, 8 Drawing Sheets

(56) References Cited

U.S. PATENT DOCUMENTS

| | | | | |
|---|---|---|---|---|
| 3,292,935 A * | 12/1966 | Cooper | ................. | G11B 3/28 369/252 |
| 3,826,505 A * | 7/1974 | Birch | ................. | G11B 3/38 369/220 |
| 3,850,435 A * | 11/1974 | Birch | ................. | G11B 3/28 369/220 |
| 3,920,249 A * | 11/1975 | Birch | ................. | G11B 3/08512 369/220 |
| 3,963,246 A * | 6/1976 | Trochimowski | ......... | G11B 3/12 369/253 |
| 4,083,565 A * | 4/1978 | Iyeta | ................. | G11B 3/08525 250/230 |
| 4,153,256 A * | 5/1979 | Guha | ................. | G11B 3/121 369/250 |
| 4,182,517 A * | 1/1980 | Rosenberg | ............... | G11B 3/12 369/247.1 |
| 4,230,323 A * | 10/1980 | Tsuji | ................. | G11B 3/08512 369/221 |
| 4,337,537 A * | 6/1982 | Hirota | ................. | G11B 3/08512 369/184 |
| 4,342,110 A * | 7/1982 | Kitamura | ........... | G11B 3/08512 369/252 |
| 4,378,491 A * | 3/1983 | Lehman | ................. | G11B 11/18 250/201.5 |
| 4,429,381 A * | 1/1984 | Paulson | ................. | G11B 17/34 369/266 |
| 4,580,258 A * | 4/1986 | Dinsdale | ................. | G11B 3/38 369/250 |
| 5,108,184 A * | 4/1992 | Brown | ................. | G11B 5/5521 356/510 |
| 2006/0203695 A1* | 9/2006 | Graham | ................. | G11B 3/10 369/252 |

FOREIGN PATENT DOCUMENTS

| | | | | |
|---|---|---|---|---|
| JP | 56047901 A | * | 4/1981 | |
| JP | 57103156 A | * | 6/1982 | |
| JP | 57172570 A | * | 10/1982 | ............. G11B 21/10 |

\* cited by examiner

APPARATUS, METHODS, AND SYSTEMS FOR CONTROLLING TONEARM TRACKING FOR A RECORD TURNTABLE

CROSS REFERENCE TO RELATED APPLICATION(S)

This application claims priority to U.S. Provisional Patent Application No. 62/120,740, filed Feb. 25, 2015, which is incorporated herein by reference in its entirety.

TECHNICAL FIELD

This application relates to apparatus, methods and systems for use with a record player/phonograph to assist in providing tangential (linear) tracking of a stylus on a record during play.

BACKGROUND

Record players commonly comprise a turntable system with a tonearm that swings horizontally/laterally about a fixed pivot axis. The fixed pivot axis is typically located adjacent to a perimeter of a platter of the turntable system. A stylus of the tonearm typically travels through an arc as it tracks a groove in a record, such as shown in FIG. 1 (prior art).

However, as is commonly accepted, it is desirable that the stylus travels a single radius path as it moves radially inward across the face of a record, rather than in an arc, within the record groove during play, approximating a consistent tangent path, or a linear tracking path (e.g., relative to concentric groove portions). It is also commonly accepted that lack of such linear tracking can cause tracking distortions, and undesirable stylus/groove side pressures on a side of the stylus because of the frictional force (e.g., "skating force") between the stylus and the walls of the groove of the record.

Furthermore, lack of linear tracking of the stylus movement within the record groove can be especially undesirable for stereo records containing separate audio channels on opposite sides of the record groove. That is, the lack of linear tracking can disturb audio balance as a result of unbalanced side pressures on the grooves.

Although some prior art tonearms provide or approximate linear tracking, they are often very complex (increasing associated expense), or do not achieve the desired goal.

BRIEF SUMMARY

Various embodiments of the present disclosure include a turntable assembly for use in playing a record, comprising a tonearm with a laser emission source attached thereto. A sensor is situated proximate the tonearm for sensing light generated by the laser emission source, and in turn, a movement actuator can adjust a position of the tonearm as a function of light intensity sensed by the sensor.

In some embodiments, the turntable assembly further comprises a slidable base attached to the tonearm, and wherein adjusting a position of the tonearm comprises moving the slidable base in at least a forward and rearward direction.

In some embodiments, multiple light sensors (e.g., two) are provided, which receive light from the laser emission source, after the light is split by a beam splitter, and refracted in different directions toward the different light sensors. A differential in light intensity received by the sensors is used to generate a control signal for the movement actuators, which can be proportional to the differential, or otherwise, a function of the differential. The control signal can be used as feedback to control the movement actuator to move the tonearm until the laser emission source is positioned to provide an even split in light intensity between the multiple light sensors, which can indicate that the tonearm is in a linear tracking position, with the laser centered on the beam splitter. The feedback can be continuous during operation to help maintain the tonearm in linear tracking position throughout record play.

In some embodiments, the tonearm of the turntable assembly comprises at least a first elongated extension member and at least a second elongated extension member. A first stabilization magnet is disposed on the first elongated extension member, and at least two stabilization magnets are disposed on the second elongated extension member. Also, the first magnet is positioned opposite the two stabilization magnets and longitudinally aligned with about a midpoint between the two stabilization magnets in a least one pivotable position of the tonearm when the tonearm is pivotably attached to a fixed location relative to a component of the movement actuator. Thus, when the tonearm is extended straight, the first magnet can have equal force exerted on it by the two stabilization magnets to help stabilize the tonearm from skating. Moreover, when the tonearm is pivoted left, or right, the first magnet can be positioned closer to the second, or third magnet, respectively, also tending to stabilize the tonearm from movement, to help prevent skating.

Various embodiments of systems and methods employing the tonearm assemblies of this disclosure are also provided.

BRIEF DESCRIPTION OF THE DRAWINGS

FIG. 3a is a perspective view of the platter and tonearm assembly of FIG. 2, assembled as part of a tonearm system.

FIG. 3b is an enlarged partial perspective view of the platter and tonearm assembly in FIG. 3a.

FIG. 3c is an enlarged view of the receiver housing in FIG. 3a

DETAILED DESCRIPTION OF EXEMPLARY EMBODIMENTS

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials associated with turntable components, electronic audio components, and records, have not been described in detail to avoid unnecessarily obscuring the descriptions of the embodiments of the disclosure.

In the present disclosure, to the extent the terms "about" and "approximately" are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, which terms and variants thereof are intended to be construed as non-limiting. The definitions in this paragraph are intended to apply throughout this disclosure unless otherwise expressly stated.

Figure 1:
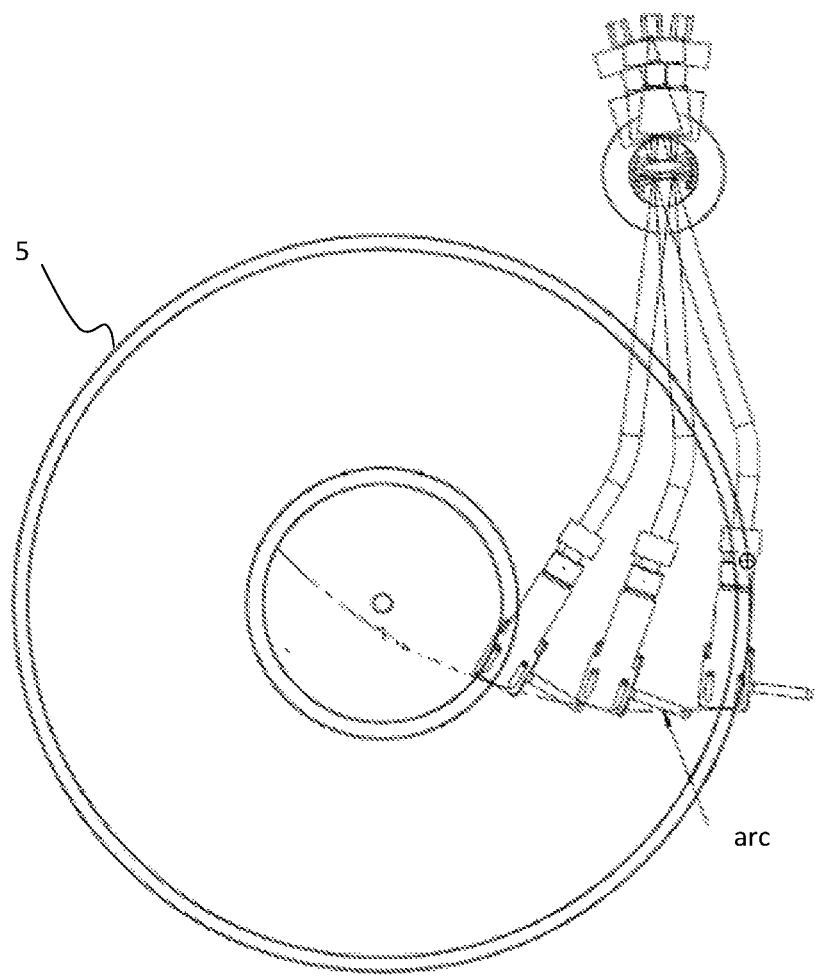
FIG. 1 is an overhead plan view of a platter and tonearm assembly of a prior art turntable system.
Figure 2:
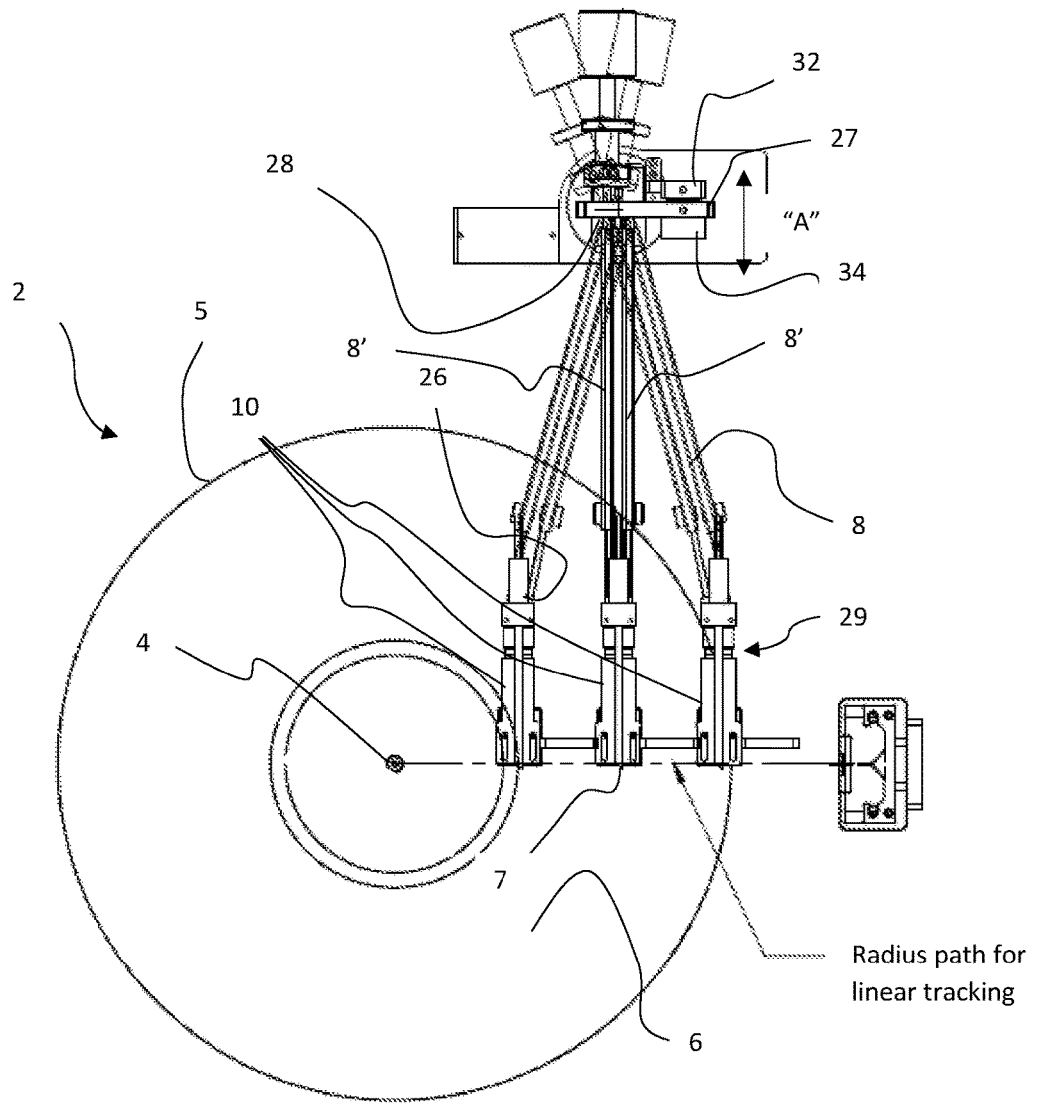
FIG. 2 is an overhead plan view of a platter and tonearm assembly for some embodiments of the present disclosure.

FIG. 2 shows an overhead plan view of a part of a turntable system 2, including a tonearm 8 and platter 5, for some embodiments of the present disclosure, using a new and novel laser guided tonearm system to achieve linear tracking. Only one tone arm 8 is intended to be illustrated in FIG. 2, but it is shown in three different positions, a center position, and a pivoted position on left and rights sides thereof.

Figures 3A, 3C:
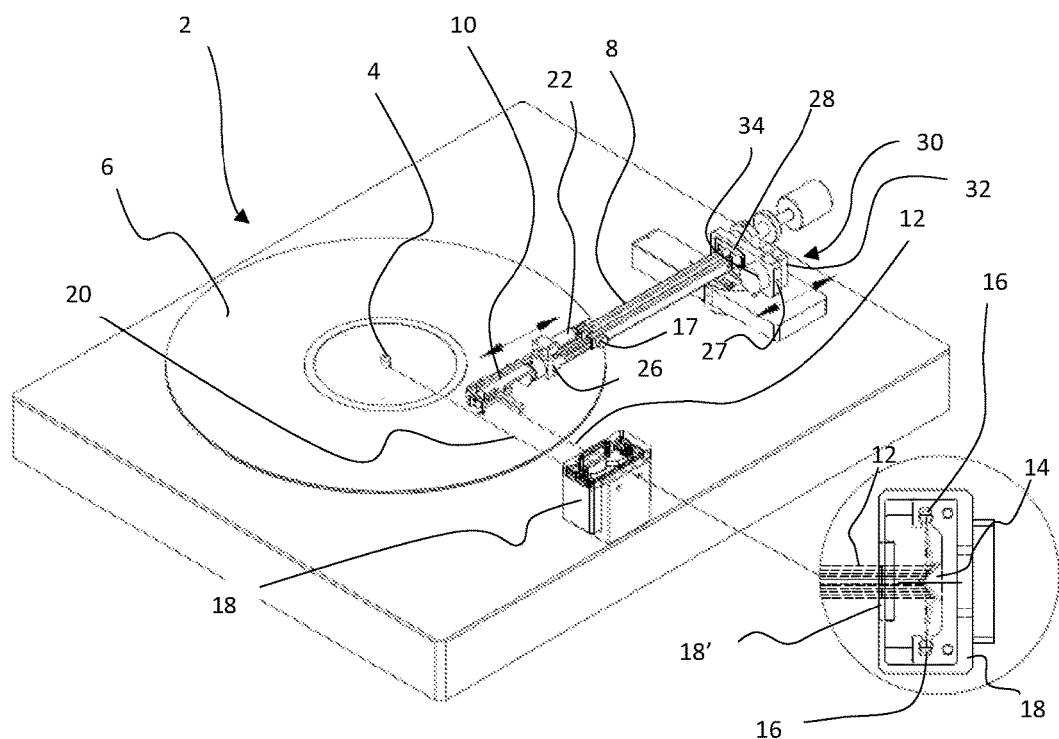
Figure 3B:
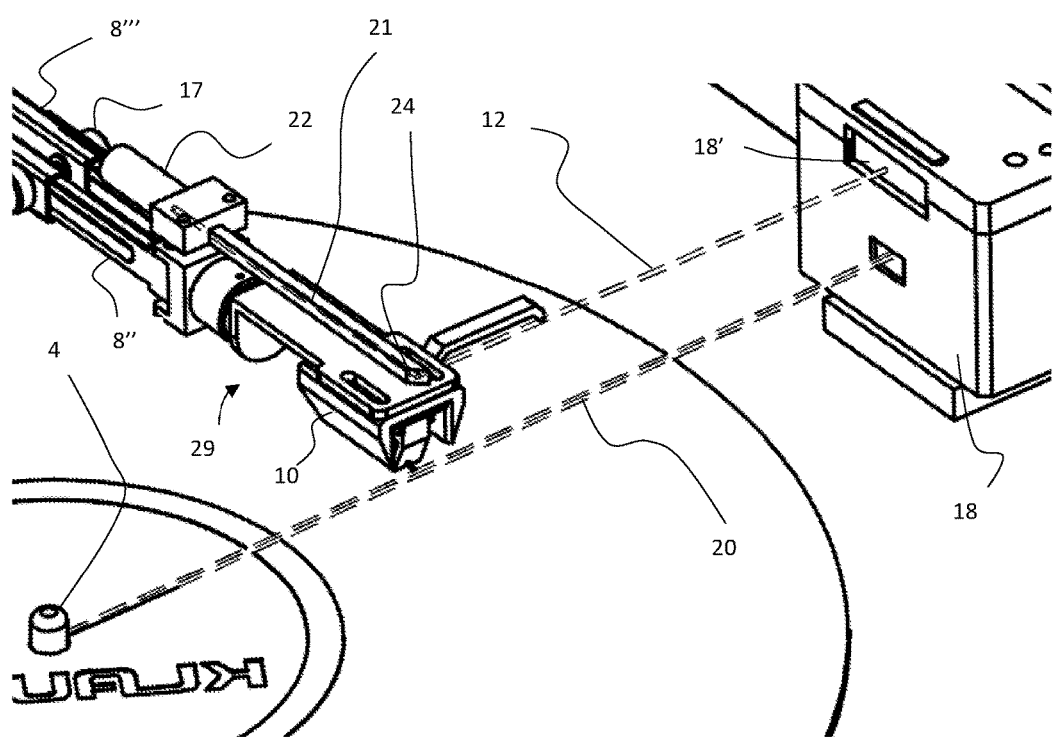

FIGS. 3a & 3b show a perspective, and a close-up partial perspective view, respectively, of an embodiment of the turntable system 2 of the present disclosure. In some embodiments, the tonearm 8 has at least two pivot locations, a front pivot 26 near the head cartridge 10, and rear pivot 28, proximate a vertical base plate 27. The pivot members, or pivots, on the tonearm 8 can be selected in construction from among of variety of options (e.g., a pivot pin, or otherwise), as will be appreciated by those skilled in the art after reviewing the present disclosure.

As can be seen in FIGS. 2 and 5a-6, in some embodiments of the present disclosure, the tonearm 8 can swing/pivot laterally inward toward a center spindle 4 about the rear pivot 28, as a needle 7 on the cartridge 10 tracks the record grooves (not illustrated) on a face of the record 6, and a front section 29 of the tonearm 8, which includes the cartridge 10, can pivot (swing left/right) about the front pivot 26, relative to the rest of the tonearm 8. The tonearm 8 an include two parallel extension members 8', and each of the pivots 26, 28, can comprise a pair of pivot connections, one on each corresponding extension members 8'.

As best seen in FIGS. 3a-3c, a laser source 22 can be connected to the front section 29 of the tonearm 8. The laser source 22 can be aligned longitudinally with the front section 29 of the tonearm 8, such that an axial laser beam 21 can be emitted from the laser source traveling forward toward a front end of the tonearm 8, including the cartridge 10, and then be refracted by a refraction mirror 24 laterally outward away from (e.g., at an angle of 90 degrees from) a longitudinal axis of the front section 29 of the tonearm 8. As best seen in FIGS. 3b and 3c, the refracted laser beam 12 can enter a window or opening 18' of a receiver, formed on a receiver housing 18, which can be disposed away from a perimeter of the rotating platter of the turntable 2, and impinge on an edge of a beam splitter 14 (e.g., a mirror or prism) of the receiver. For example, the beam splitter 14 can have opposite refractive sidewalls that converge at an apex edge facing the refracted laser beam 12 and can split the beam 12 into two components that are, in turn, directed at opposite sensors 16 on opposite sides of the beam splitter 14 (See, e.g., FIG. 3c). A difference in intensity/allocation of light to the opposite sensors 16 is then converted to an electrical signal for use in adjusting a magnetic field at electromagnet assembly 30.

Referring to FIGS. 3a, 6, 7a, and 7b, the electromagnet assembly 30 can comprise a first attractive/repulsive component 32, and a second attractive/repulsive component 34, the respective components being configured to exert force relative to one another. In some embodiments, an electromagnetic force exerted between the components is configured to be a function of (e.g., proportional to) a difference in the intensity of light sensed at the sensors 16 in the receiver housing 18. For example, in some embodiments, a biasing component (e.g., a spring) 32' can cause the components 32, 34, to be biased toward one another by default, and the electromagnetic force can be configured to repulse the components 32, 34 as a function of the signal received, overcoming a force of the biasing member. Alternatively, in other embodiments, the biasing component can be configured to cause the components 32, 34 to be biased away from one another by default, and the electromagnetic force can be configured to attract the components toward one another as a function of the signal received, overcoming a force of the biasing member. Finally, alternatively, in some embodiments, no biasing member is provided to bias the components toward, or away, from one another, and a distance between the components can be controlled by repulsive and/or attractive electromagnetic forces (e.g., flipping polarity), as will be appreciated by those skilled in the art immediately after reviewing this disclosure.

In all of the embodiments described above, the rear pivot 28 of the tonearm 8 can be fixedly attached to a base 27 (which can be a vertical base plate), which is, in turn, attached to the second component 34, and both the vertical base plate 27 and second component 34, can be slidably movable toward, and away from, the platter 5 of the turntable (e.g., such as in the directions of arrow "A" in FIGS. 2 & 6), whereas, a position of the first components 32, can be fixed. As such, the adjustment of electromagnetic force described above, to move the components 32, 34, relative to one another, can move the rear pivot 28 in the directions of arrow "A" as necessary to maintain a fixed linear radial path for the needle in the head cartridge, to approximate linear tracking of the needle, as will be immediately appreciated by those skilled in the art after reviewing this disclosure.

Figures 5A, 5B:
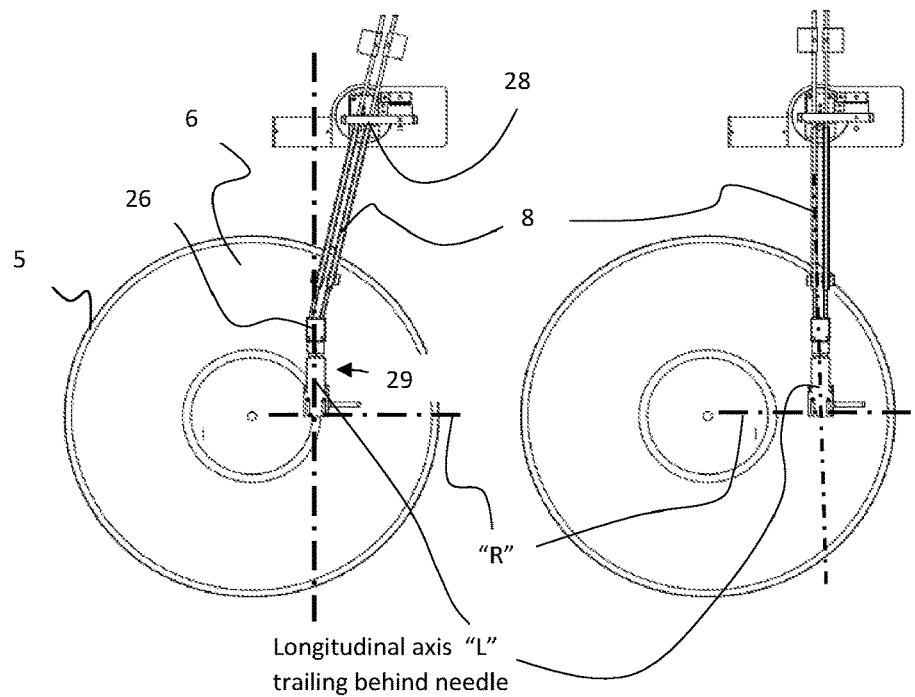
FIGS. 5a-5c are overhead plan views of a platter and tonearm assembly (without the laser beam receiver/beam splitter being shown) of a tonearm system, for some embodiments of the present disclosure, each of the FIGS. 5a, 5b and 5c showing different pivot positions of the tonearm.

That is, for example, referring to FIG. 5a, when the record 6 is rotated in a clockwise direction and the needle tracks grooves, the front section 29 will have a natural tendency to pull away from the rear pivot 28, in a manner such that a longitudinal axis "L" of the front section 29 trailing behind the needle will align with a tangent line of the circular groove being tracked, provided that the longitudinal axis is permitted to float in that trailing position. If so, the longitudinal axis "L" of the front section 29 will remain at 90 degrees relative to a linear radial path "R" of the needle, and a distance between the front pivot 26 and a nearest point on the linear radial path "R" will remain the same throughout travel of the needle. In order to maintain the distance between the front pivot 26 and the linear radial path at a consistent value, the rear pivot 28 must move as a function of the position of the front pivot 26. As described above, in various embodiments of the present disclosure, the movement of the rear pivot 28 is accomplished indirectly based on feedback signal provided by the refracted laser beam 12. That is, by adjusting the electromagnetic force between components 32, 34 to maintain equal light intensity between sensors 16, the rear pivot 28 slides in the directions of arrow "A" to allow the front pivot 26 to maintain a consistent distance from the linear radial path "R," and in turn, a longitudinal axis "L" of the front section 29 stays within a tangent line to allow tangential (linear) tracking.

Figure 4:
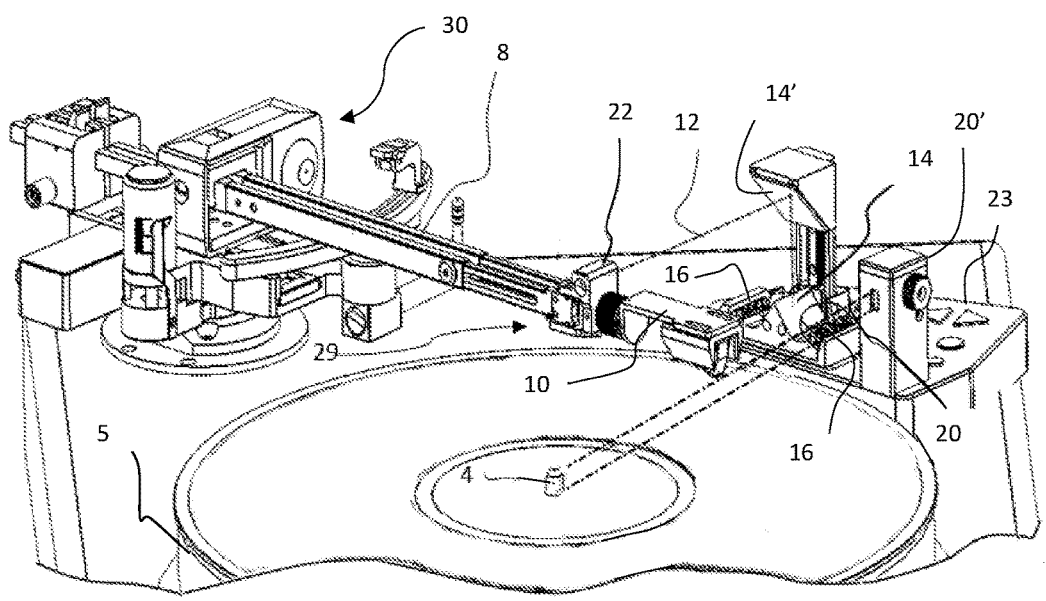
FIG. 4 is a partial perspective view of a platter and tonearm assembly, assembled as part of a tonearm system for an alternate embodiment of the present disclosure.
Figure 5C:
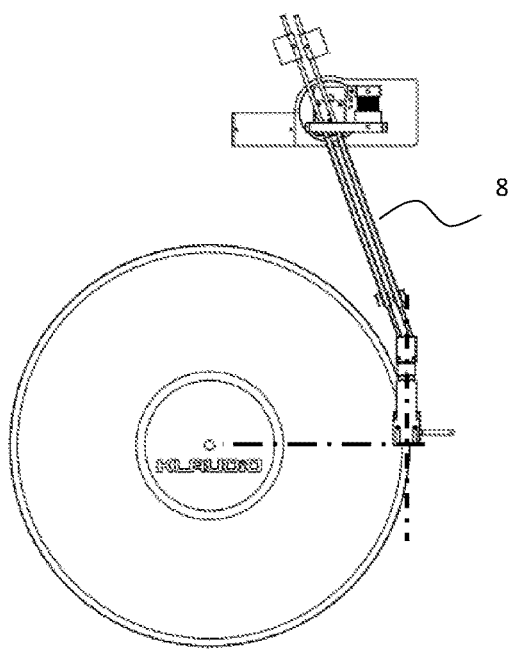
Figure 6:
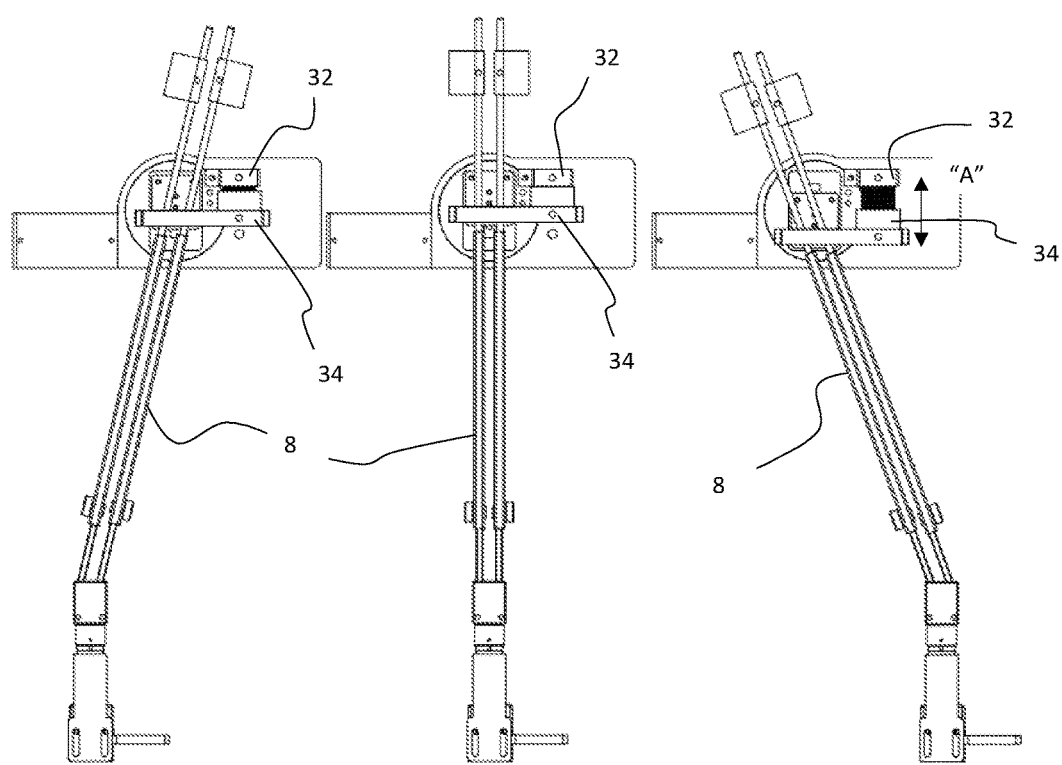
FIG. 6 shows enlarged overhead plan views of the tonearm with electromagnet assembly of FIGS. 5a-5c, in different pivot positions for some embodiments of the present disclosure.
Figure 7A:
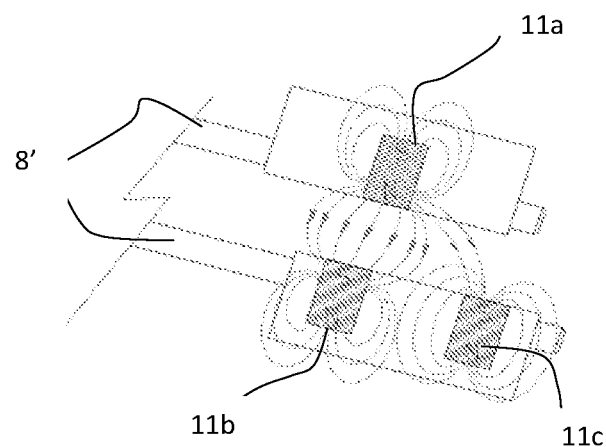
FIGS. 7a-7c shows simplified overhead views of a rear portion of the tone arm of FIGS. 5a-5c in different pivot positions of the tonearm, also showing stabilization magnets, for some embodiments of the present disclosure.
Figure 7B:
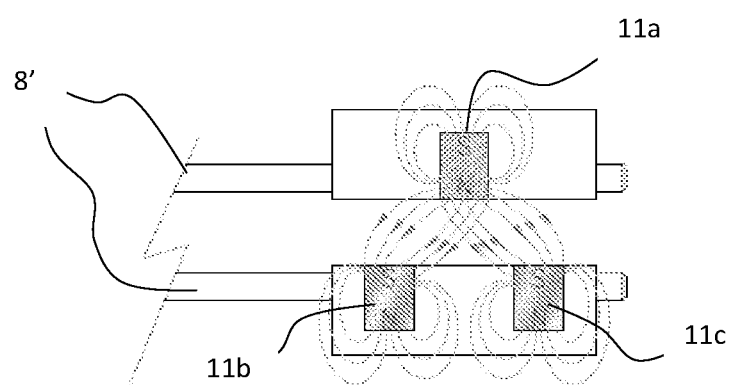
Figure 7C:
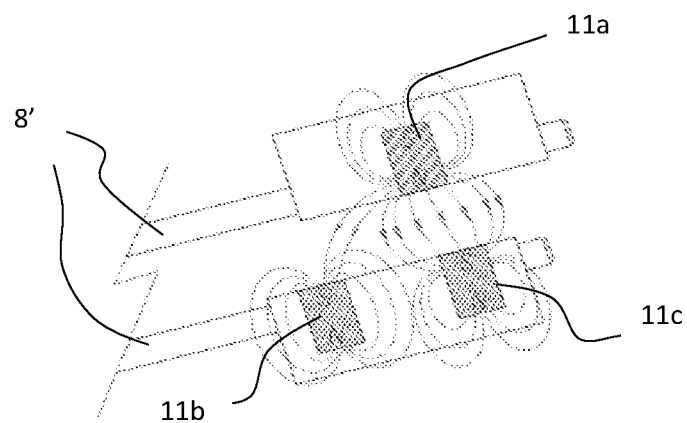

In some embodiments of the present disclosure, a counter-weight is provided on each rear portion of a pair of rear longitudinal members (rear portions of extension members 8') of the tonearm, as best seen in FIGS. 2 and 3a. Also, in some embodiments, rear portions of the extension members 8', can include stabilizing magnets, as best seen in FIGS. 4-6, and in particular, FIGS. 7a-7c. Due to the offset between the cartridge's axis and the pivot locations, friction on the stylus tends to draw the tonearm laterally inward or outward and can distort the balance of the sound and cause uneven wear on the stylus. FIGS. 7a-7c show an embodiment of the present disclosure in which a first magnet 11a is provided on a rear portion of a first extension member 8', and a second magnet 11b and third magnet 11e are provided on a parallel laterally opposite rear portion of a second extension member 8'. The first magnet 11a is disposed at a longitudinal location that is aligned with a longitudinal midpoint between the second and third magnets, when the first extension member and second extension member 8' are un-pivoted, as shown in FIG. 7b. Thus, in such embodiments, when the extension members 8' un-pivoted and extending straight as shown in FIG. 7b (See, Also, FIG. 5b), then the first magnet 11a is generally equal distance from the second magnet 11b and third magnet 11c, with the second magnet 11b being offset in a forward direction from the first magnet 11a, and the third magnet 11c being offset in a rearward direction from the first magnet 11a. Also, in some embodiments, the first magnet 11a has a laterally inward facing pole that is attracted to the laterally inward facing poles of the second and third magnets, and as such, equal magnetic component forces are exerted on the first magnet in both a rearward and forward direction, to help stabilize the relative positions of the extension members 8' against pivoting. Also, when the forward portions of the extension members 8' are pivoted laterally toward a center of the turntable toward the spindle 4, such as shown in FIGS. 5a and 7a, since the pivot location 28 is fixed on the both extension members, the overall longitudinal alignment of the extension members 8' becomes off-set, and thus, the first magnet 11a shifts closer to the second (forward) magnet 11b so that attractive force exerted between the first and second (forward) magnet is greater than that between the first magnet and third (rearward) magnet, to help stabilize the pivoted position of the extension members 8'. The opposite effect is imparted when forward portions of the extension members 8' are pivoted laterally outward away from the spindle 4, in that the first magnet 11a then longitudinally shifts closer to the third (rearward) magnet 11c, so that the attractive forward between the first and third magnet, is greater than the attractive force between the first and second magnet, again helping to stabilize the current pivoted position of the extensions members 8 (or tonearm) overall. As will be appreciated by those skilled in the art after reviewing this disclosure, the configuration of the multiple magnets 11a, 11b and 11c on the extension members can thus help counter skating due to its stabilizing effect on the position of the tonearm 8.

In some embodiments, the tonearm assemblies of the present disclosure (e.g., tonearm 8 with laser source and electromagnetic assembly, and receiver (with beam splitter and sensors)), can be installed by a user on a pre-existing turntable 2), along with the receiver housing 18. As such, the tonearm 8 and receiver housing 18 can require calibration.

Referring to FIG. 3b, in some embodiments, a calibration laser is provided within the receiver housing 18, which can emit a calibration laser beam 20 that is useable for aligning the receiver housing 18 with the platter spindle 4. For example, the beam splitter 14 can be disposed in the receiver housing 18, such that when a user activates the calibration laser and aligns the calibration laser beam 20 to strike the center spindle 4 of the turntable at 90 degrees to a tangent line of the turntable, then the symmetrical beam splitter 14 can be positioned such that when the refracted laser 12 bisects it through the apex edge, the needle on the tonearm 8 will be aligned for travel along the linear radial path "R."

As can be seen in FIGS. 3a and 3b, in some embodiments, tonearm adjustment members 17 are provided, for use in adjusting a length of a portion of the tonearm 8. The adjustment can comprise turning the adjustment members 17 to loosen a front portion 8" of each extension member 8' of the tonearm 8 shaft relative to a middle portion 8''' thereof, to allow the respective portions 8", 8''' to telescopically slide in relation to one another, in order for a user to shorten or elongate the total length of the tonearm 8. For example, when the tonearm 8 is installed on a turntable, after a position of the receiver housing 8 is calibrated, the tonearm 8 length can be adjusted so that the needle rests on the linear radial path "R" throughout motion along a record being played, as will be appreciated by those skilled in the art after reviewing this disclosure.

FIG. 4 shows another alternative for some embodiments of the present disclosure, in which the laser beam received on the beam splitter 14 has not been be previously refracted, but instead, is directly emitted from a laser source 22 attached to a front section 29 of the tonearm 8, immediately before the cartridge 10. In such embodiments, the laser source 22 can be positioned to emit a guiding laser beam having an axis that is aligned at 90 degrees relative to a longitudinal axis of the front section 29. As such, no refraction mirror is required in such embodiments. Also, in such embodiments, an alignment or calibration beam 20 can be provided via a separate source housed in a separate calibration light housing 20'.

Still referring to FIG. 4, in this alternative embodiment, a refractor 14' can be provided that is positioned above the beam splitter 14, in a configuration in which the incoming laser 12 from the laser source 22 is refracted downward by refractor 14' before impinging on the beam slipper 14, with an apex edge of the beam splitter 14 facing upward to meet the downwardly refracted beam 22. Similar to the previously described embodiments, the split beams from the beam splitter can then be detected by opposite sensors 16 to determine relative intensity, based upon which, control signals are sent to the electromagnet assembly 30.

In some embodiments, a user can install a turntable assembly comprising the tonearm 8 with base plate 27 (including electromagnetic assembly 30), receiver (beam splitter and opposite sensors, which can be contained in a receiver housing 18), and calibration laser source (which can be mounted together on a base 23 (See, e.g., FIG. 4) with the receiver in some embodiments). The turntable assembly can be installed on an existing turntable system to replace the prior art tonearm and tonearm mount, with the tonearm 8 and electromagnetic assembly 30.

The various embodiments described herein, including all of the drawings, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the invention. Reference throughout this specification to "one embodiment," "an embodiment," "additional embodiment(s)" or "some embodiments," and analogous terms, means that a particular feature, structure or characteristic described in connection with the embodiment(s) is included in at least one or some embodiment(s), but not necessarily all embodiments, such that the references do not necessarily refer to the same embodiment (s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A turntable assembly for use in playing a record comprising:
    a tonearm having a rear pivot;
    a laser emission source attached to the tonearm;
    a sensor for sensing light generated by the laser emission source;
    a movement actuator configured to adjust a position of the rear pivot of the tonearm in at least a forward and rearward direction along a horizontal axis parallel to a face of a platter, as a function of light intensity sensed by the sensor.

2. The turntable assembly of claim 1 further comprising a slidable base attached to the tonearm, wherein adjusting a position of the rear pivot of the tonearm comprises moving the slidable base.

3. The turntable assembly of claim 1 wherein the light intensity is a function of position of the tonearm.

4. The turntable assembly of claim 1 wherein the movement actuator comprises an electromagnetic assembly, and wherein as the intensity of light sensed on the sensor increases, electromagnetic force exerted on a component of the electromagnetic assembly is adjusted.

5. The turntable assembly of claim 1 further comprising a beam splitter configured to refract light from the laser emission source toward the sensor.

6. The turntable assembly of claim 5 further comprising a second sensor disposed on an opposite side of the beam splitter than the sensor, also disposed in a position to receive refracted light from the beam splitter.

7. A tonearm assembly comprising:
    a tonearm having at least one rear pivot and at least one front pivot;
    a laser emission source attached to a front section of the tonearm;
    a receiver for receiving a laser beam from the laser emission source;
    a movable base attached to a rear portion of the tonearm; and
    a movement actuator attached to the moveable base, the movement actuator being configured to move as a function of position with which the laser beam from the laser emission source strikes a component of the receiver.

8. The tonearm assembly of claim 7 wherein the movable base is attached to the tonearm at the at least one rear pivot.

9. The tonearm assembly of claim 7 wherein the movable base is configured to be moveable along an axis that is parallel to a plane in which the tonearm extends.

10. A turntable system for use in playing a record comprising:
    a platter;
    a tonearm, with a laser light source attached thereto;
    a beam splitter positioned to receive laser light emitted from the laser light source and for splitting the laser light emitted from the laser light source;
    a movement actuator coupled to the tonearm, wherein the movement actuator comprises an electromagnetic assembly configured to receive control signals as a function of light intensity; and
    a tonearm pivot, wherein the movement actuator is configured to adjust a position of the tonearm pivot laterally toward and away from the platter.

11. The turntable system of claim 10 wherein the function of light intensity comprises a differential measurement between two different light intensities.

12. The turntable system of claim 10 wherein the tonearm comprises at least two separate elongated extension members, and wherein a first one of the elongated extensions members includes a first stabilization magnet attached thereto, and wherein a second one of the elongated extension members includes at least two stabilization magnets attached thereto, and wherein the tonearm is pivotable to a plurality of positions and in at least one of the positions the first stabilization magnet is aligned with about a longitudinal midpoint between the two stabilization magnets and is equidistance from the two stabilization magnets.

13. The turntable system of claim 12 wherein in at least a second of the positions of the pivotable tonearm, the first stabilization magnet is aligned closer to at least one of the two stabilization magnets than the other of the two stabilization magnets.

* * * * *